United States Patent [19]

Kawasaki et al.

[11] Patent Number: 5,067,393
[45] Date of Patent: Nov. 26, 1991

[54] PISTON HEAD BLOCK FOR INTERNAL COMBUSTION ENGINE

[75] Inventors: Isamu Kawasaki; Kazunari Hirata, both of Kanagawa, Japan

[73] Assignee: Atsugi Motor Parts Company Limited, Kanagawa, Japan

[21] Appl. No.: 397,522

[22] Filed: Aug. 23, 1989

[30] Foreign Application Priority Data

Aug. 31, 1988 [JP] Japan .................. 63-114463

[51] Int. Cl.⁵ .................................. F01P 3/00
[52] U.S. Cl. ........................ 92/186; 123/193 P
[58] Field of Search ............... 123/193 P; 92/186

[56] References Cited

U.S. PATENT DOCUMENTS

| | | | |
|---|---|---|---|
| 3,424,138 | 1/1969 | Dreisin | 92/186 |
| 4,026,197 | 5/1977 | Lapke et al. | 92/186 |
| 4,286,505 | 9/1981 | Amdall | 92/186 |
| 4,428,330 | 1/1984 | Shimizu | 92/186 |
| 4,530,312 | 7/1985 | Kanda et al. | 92/186 |
| 4,608,947 | 9/1986 | Stadler | 92/186 |
| 4,907,545 | 3/1990 | Mills | 92/186 |

Primary Examiner—Andrew M. Dolinar
Assistant Examiner—M. Macy
Attorney, Agent, or Firm—Bachman & Lapointe

[57] ABSTRACT

A piston head block is provided with smaller exernal diameter at the portion where a cut-out for receiving a lubricant injection nozzle that remaining portion. With the smaller diameter, a clearance or gap is formed between the internal surface of an engine cylinder and the external surface of the smaller diameter portion. Therefore, during piston stroke, the smaller diameter portion, in which the lubricant injection nozzle receptacle cut-out is formed, becomes free from the transverse stress.

11 Claims, 2 Drawing Sheets

PISTON HEAD BLOCK FOR INTERNAL COMBUSTION ENGINE

BACKGROUND OF THE INVENTION

1. Field of the Invention

The present invention relates generally to a piston assembly for an internal combustion engine, particularly for an automotive internal combustion engine. More specifically, the invention relates to a piston head block suitable for such an internal combustion engine which has an active lubrication system for injecting lubricant through an injection nozzle oriented in the engine cylinder in the vicinity of the bottom-dead-center (BDC) of the piston.

2. Description of the Background Art

Japanese Utility Model First (unexamined) Publication (Jikkai) Showa 57-89809 discloses a of piston head block which is suitable for use in an automotive internal combustion engine with an active lubrication system. In the disclosed piston head block, a cut out is formed in the skirt section so as to receive therein a lubricant injecting nozzle in the vicinity of BDC of the piston stroke. Such an arrangement is effective for permitting the piston head to stroke beyond the position of the lubricant injection nozzle in the piston induction or combustion stroke. This allows the overall axial length of the engine cylinder to be made shorter for making the engine block height lower.

On the other hand, formation of a cut out in the skirt section of the piston head block forms a critical point on the piston for causing degradation of the fatigue resistance. Namely, though the prior proposed piston head block is formed with the cut-out with smoothly curved edge so as to minimize concentration of stress, it is still difficult to avoid concentration of stress during the piston stroke. Particularly, during piston stroke, transverse load perpendicular to the piston stroke axis is applied through the cone rod. This transverse force serves as a source of stress to cause cracking in the skirt at the portion where concentration of stress is caused.

SUMMARY OF THE INVENTION

Therefore, it is an object of the present invention to provide a piston head block which is free from the problem in the prior art.

In order to accomplish the aforementioned and other objects, a piston head block, according to the present invention, is provided with a smaller external diameter at the portion where there is a cut-out for receiving a lubricant injection nozzle then at the remaining portion. With the smaller diameter, a clearance or gap is formed between the internal surface of an engine cylinder and the external surface of the smaller diameter portion. Therefore, during piston stroke; the smaller diameter portion, in which the lubricant injection nozzle receptacle cut-out is formed, becomes free from the transverse stress.

According to one aspect of the invention, a piston for an internal combustion engine which has a lubricant injection nozzle, comprises:

a piston head block having a head section and a skirt section which is formed with a nozzle receptacle cut-out for receiving said lubricant injection nozzle at a piston stroke position in the vicinity of bottom-dead-center; and means for defining a clearance between the outer periphery of the portion of said skirt section, where said nozzle receptacle cut-out is formed, and the inner periphery of an engine cylinder wall, said clearance avoiding direct contact of said portion with said inner periphery of said cylinder wall.

The clearance defining means comprises a small diameter section formed in a portion including said nozzle receptacle cut-out. The circumferential edge position of said nozzle receptacle cut-out has greater thickness than that of other portions. The nozzle receptacle cut-out is defined by smoothly curved circumferential edge.

According to another aspect of the invention, a piston for an internal combustion engine which has a lubricant injection nozzle projecting into the interior space of an engine cylinder for injecting lubricant for cooling and lubrication, comprises:

a piston head block having a head section and a skirt section which is formed with a nozzle receptacle cut-out for receiving said lubricant injection nozzle at a piston stroke position in the vicinity of bottom-dead-center; and means for preventing a transverse force in a direction perpendicular to a piston stroke axis from directly acting on the portion where the cut-out is formed.

BRIEF DESCRIPTION OF THE DRAWINGS

The present invention will be understood more fully from the detailed description given herebelow and from the detailed description of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
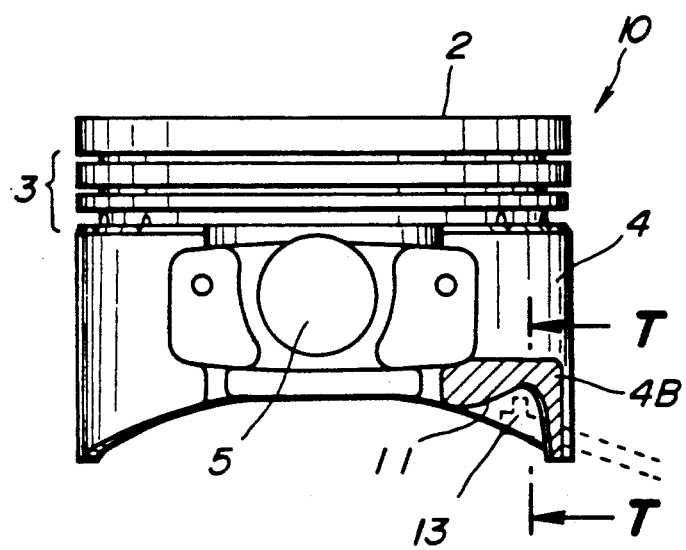
FIG. 1 is a front elevation of the preferred embodiment of a piston head block according to the present invention.
Figure 3:
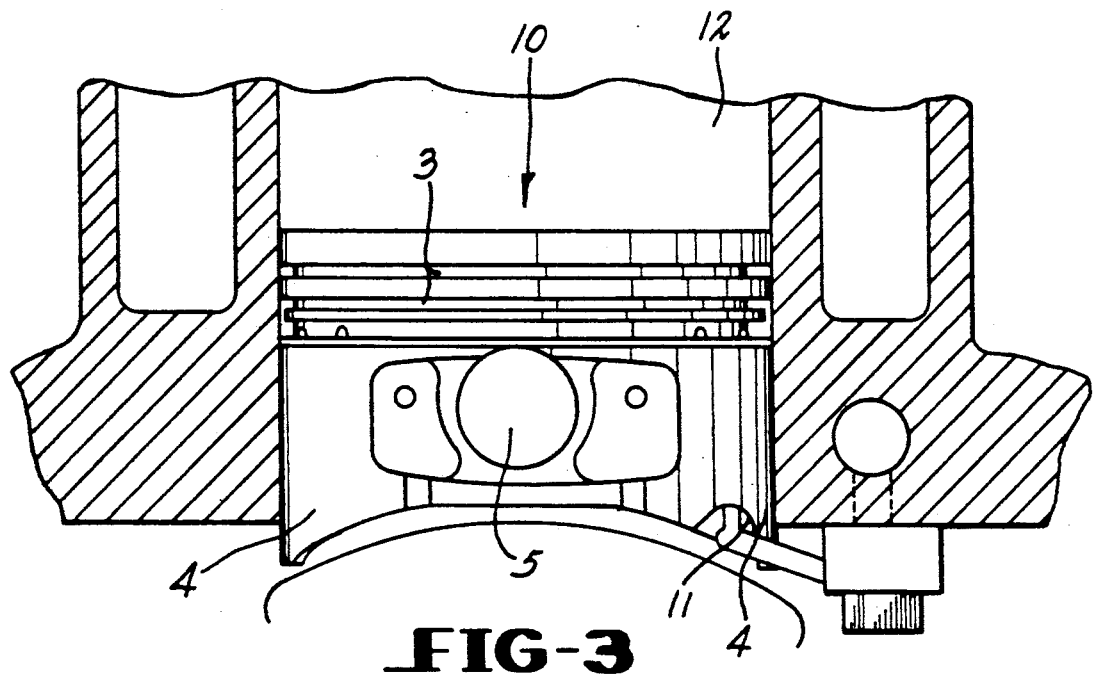
FIG. 3 is a further front view of a piston head block according to the present invention and a lubricant injection nozzle.

Referring now to the drawings, particularly to FIGS. 1 and 3, the preferred embodiment of a piston head block 10 is formed with a plurality of piston ring receptacle grooves 3 in the vicinity of a head portion 2. A skirt portion 4 is extended from the head portion 2. A connector pin receptacle opening 5 is formed through the piston head block for receiving a connector pin for connecting the piston to a crankshaft (not shown) via a cone rod (not shown).

The shown embodiment of the piston head block 10 is particularly adapted for use in an internal combustion engine which has a lubricant injection nozzle for injecting a lubricant toward the piston for cooling and lubricating the latter. The lubricant injection nozzle is oriented at a position where the skirt portion 4 passes thereacross during the piston stroke in the stroke position in the vicinity of BDC. In order to receive the lubricant injection nozzle in the vicinity of BDC, a nozzle receptacle cut-out 11 is formed in the skirt portion 4 of the piston head block 10.

Figure 4:
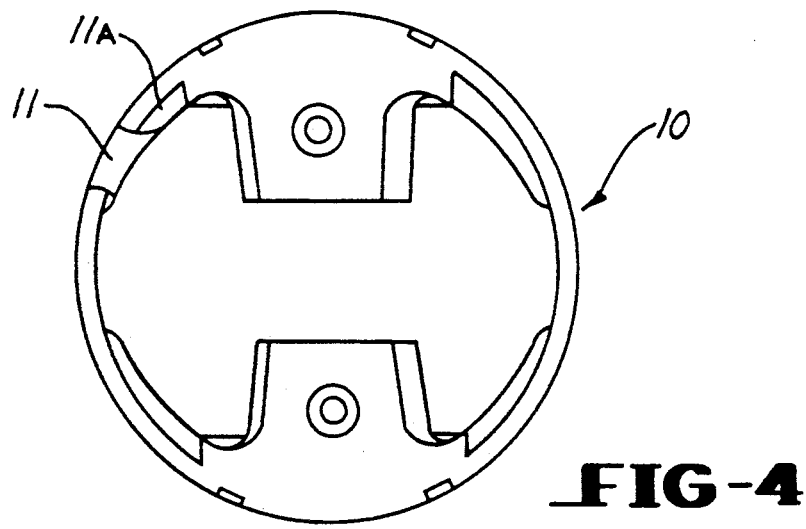
FIG. 4 is a bottom view of the piston head block of FIG. 1 showing a thickened circumferential edge portion extending along the cut-out.
Figure 5:
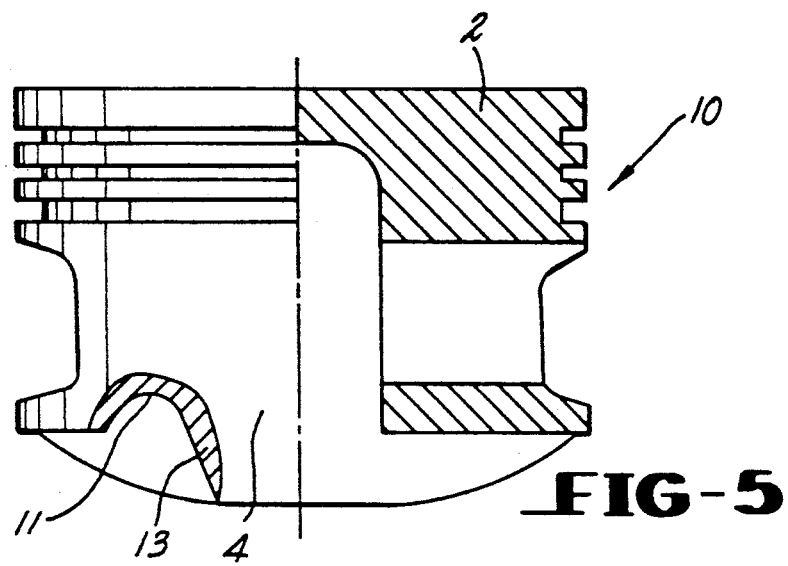
FIG. 5 is a view of a piston head block according to the present invention with a reinforcement surrounding the cut-out.

Surrounding the cut-out 11, a reinforcement 13 may be provided for providing higher stress resistance and higher fatigue resistance. For example, in the shown embodiment, the thickness of the circumferential edge portion 11A extending along the cut-out 11 is thicker than the general section as seen from FIGS. 2 and 4. This thicker edge portion 11A may provide sufficient strength resisting against stress exerted on the piston head block and avoid local concentration of stress which result in cracking. On the other hand, it may be possible to provide reinforcement 13 formed of a different material than the remainder portion, as shown in FIG. 5. An example of the material and construction of the reinforcement 13 has been disclosed in co-pending, allowed U.S. patent application Ser. No. 359,707, filed on May 31, 1989. The disclosure of this co-pending U.S. patent application is herein incorporated by reference for the sake of disclosure.

Figure 2:
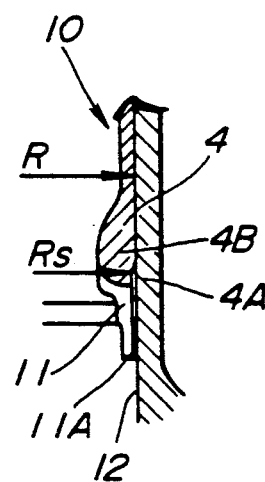
FIG. 2 is an enlarged section of the major portion of the piston head block of the preferred embodiment, which is shown in a condition where the piston is applied for a specific construction of an automotive internal combustion engine.

As particularly shown in FIG. 2, the skirt portion 4 where the nozzle receptacle cut-out 11, has a diameter Rs which is smaller than a diameter R of the general section. Therefore, a clearance is defined between an outer periphery 4A of the skirt portion 4 and the inner periphery of an engine cylinder wall 12. The clearance 13 serves to prevent a transverse force in the direction perpendicular to the piston stroke axis from directly exerting on the portion where the cut-out 11 is formed. Therefore, the transverse force can be effectively distributed to the overall surfaces of the piston for avoiding concentration of stress at the particular portion in the cut-out 11. This makes the nozzle receptacle cut-out free from the stress.

The skirt portion 4 may be machined after casting for reducing the diametrical size. However, it is also possible to form the smaller diameter section by casting utilizing a casting mold for which smaller section is formed.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A piston for an internal combustion engine which has a lubricant injection nozzle, comprising:
   a piston head block having a head section and a skirt section, said skirt section being formed with a cut-out for receiving said lubricant injection nozzle at a piston stroke position in the vicinity of bottom-dead center in the piston stroke, said cut-out extending into said skirt portion; and
   means for defining a clearance between an outer periphery of a lower edge portion of said skirt section containing said cut-out and an inner periphery of an engine cylinder wall, said clearance avoiding direct contact of said lower edge portion with said inner periphery of said cylinder wall so as to prevent a transverse force in a direction perpendicular to a piston stroke axis from being exerted on said lower edge portion where said cut-out is formed.

2. A piston as set forth in claim 1, wherein said clearance defining means comprises a small diameter section formed in a portion of said skirt section including said cut-out.

3. A piston for an internal combustion engine which has a lubricant injection nozzle, comprising:
   a piston head block having a head section and a skirt section which is formed with a nozzle receptacle cut-out for receiving said lubricant injection nozzle at a piston stroke position in the vicinity of bottom-dead center in the piston stroke;
   means for defining a clearance between an outer periphery of a lower edge portion of said skirt section where said nozzle receptacle cut-out is formed, and an inner periphery of an engine cylinder wall, said clearance avoiding direct contact of said lower edge portion with said inner periphery of said cylinder wall; and
   a circumferential edge portion of said nozzle receptacle cut-out having greater thickness than that of other portions.

4. A piston as set forth in claim 1, wherein said cut-out is defined by smoothly curved circumferential edge.

5. A piston for an internal combustion engine which has a lubricant injection nozzle projecting into an interior space of an engine cylinder for injecting lubricant for cooling and lubrication, comprising:
   a piston head block having a head section and a skirt section, said skirt section being formed with a cut-out for receiving said lubricant injection nozzle at a piston stroke position in the vicinity of bottom-dead center in the piston stroke, said cut-out extending into said skirt portion; and
   means for preventing a lower edge portion of said skirt section where said cut-out is formed from being directly subjected to a transverse force in a direction perpendicular to a piston stroke axis.

6. A piston as set forth in claim 5, wherein said preventing means defines a clearance between an outer periphery of the lower edge portion of said skirt section, where said cut-out is formed, and an inner periphery of an engine cylinder wall, said clearance avoiding direct contact of said lower edge portion with said inner periphery of said cylinder wall.

7. A piston as set forth in claim 6, wherein said preventing means defining said clearance comprises a small diameter section formed in a portion of said skirt section including said cut-out.

8. A piston for an internal combustion engine which has a lubricant injection nozzle projecting into an interior space of an engine cylinder for injecting lubricant for cooling and lubrication comprising:
   a piston head block having a head section and a skirt section which is formed with a nozzle receptacle cut-out for receiving said lubricant injection nozzle at a piston stroke position in the vicinity of bottom-dead center in the piston stroke;
   means for preventing a lower edge portion of said skirt section where said nozzle receptacle cut-out is formed from being directly subjected to a transverse force in a direction perpendicular to a piston stroke axis;
   said preventing means defining a clearance between an outer periphery of the lower edge portion of said skirt section where said nozzle receptacle cut-out is formed and an inner periphery of an engine cylinder wall, said clearance avoiding direct contact of said lower edge portion with said inner periphery of said cylinder wall;

said preventing means defining said clearance comprising a small diameter section formed in a portion of said skirt section including said nozzle receptacle cut-out; and a circumferential edge portion of said nozzle receptacle cut-out has greater thickness than that of other portions.

9. A piston as set forth in claim 8, wherein said nozzle receptacle cut-out is defined by smoothly curved circumferential edge.

10. A piston for an internal combustion engine which has a lubricant injection nozzle comprising:

a piston head block having a head section and a skirt section, said skirt section being formed with a cut-out for receiving said lubricant injection nozzle at a piston stroke position in the vicinity of bottom-dead center in the piston stroke, said cut-out extending into said skirt portion; and means for defining a clearance between an outer periphery of a reinforced portion extending along a circumferential edge of said skirt section and an inner periphery of an engine cylinder for resisting against a stress exerted in a transverse direction to an axis of said piston, said reinforced portion being spaced from the inner periphery of said engine cylinder for reduction of said transversely exerted stress on said reinforced portion.

11. A piston for an internal combustion engine which has a lubricant injection nozzle comprising:

a piston head block having a head section and a skirt section, said skirt section being formed with a cut-out for receiving said lubricant injection nozzle at a piston stroke position in the vicinity of bottom-dead center in the piston stroke, said cut-out extending into said skirt portion and said piston having a general section maintained in sliding contact with an inner periphery of an engine cylinder wall; and means for defining a clearance between an outer periphery of a reinforced portion extending along a circumferential edge of said skirt section and said inner periphery for resisting against a stress exerted in a transverse direction to an axis of said piston, said reinforced portion being spaced from the inner periphery of said engine cylinder wall for reduction of said transversely exerted stress on said reinforced portion.

* * * * *